United States Patent
Shi et al.

(10) Patent No.: US 11,967,123 B1
(45) Date of Patent: Apr. 23, 2024

(54) BINARIZATION METHOD FOR CT SECTIONAL IMAGE OF FIBER PACKAGE CONTAINING ARTIFACTS

(71) Applicant: Xidian University, Xi'an (CN)

(72) Inventors: Tengyin Shi, Xi'an (CN); Yiqun Zhang, Xi'an (CN); Zhuo Zhang, Xi'an (CN); Hongzhang Feng, Xi'an (CN); Shen Li, Xi'an (CN); Dongwu Yang, Xi'an (CN); Naigang Hu, Xi'an (CN); Yongxi He, Xi'an (CN)

(73) Assignee: XIDIAN UNIVERSITY, Xi'an (CN)

( * ) Notice: Subject to any disclaimer, the term of this patent is extended or adjusted under 35 U.S.C. 154(b) by 0 days.

(21) Appl. No.: 18/499,307

(22) Filed: Nov. 1, 2023

(30) Foreign Application Priority Data

Mar. 20, 2023 (CN) .......................... 202310274184.X (51) Int. Cl.
  *G06T 7/194* (2017.01)
  *G06T 5/00* (2006.01)
  (Continued)

(52) U.S. Cl.
  CPC .............. *G06V 10/28* (2022.01); *G06T 5/002* (2013.01); *G06T 5/40* (2013.01); *G06T 7/194* (2017.01);
  (Continued)

(58) Field of Classification Search
  CPC ........ G06V 10/28; G06V 10/60; G06T 5/002; G06T 5/40; G06T 7/194; G06T 2207/10081; H04N 5/272
  (Continued)

(56) References Cited

U.S. PATENT DOCUMENTS

| 9,697,599 B2 * | 7/2017 | Prasad ................... G06T 7/0016 |
| 2013/0230230 A1 * | 9/2013 | Ajemba ................ G06T 7/0012 |
| | | 382/133 |

(Continued)

OTHER PUBLICATIONS

Xidian University (Applicant), Preliminary Amendment for CN202310274184.X, w/ (allowed) replacement claims, Aug. 25, 2023.

(Continued)

*Primary Examiner* — Ali Bayat
(74) *Attorney, Agent, or Firm* — Zhigang Ma (57) ABSTRACT

Provided is a binarization method for CT sectional image of fiber package containing artifacts, which includes: performing brightness adjustment on the source image obtained after converting of the HSV image model by using a composite tangent function; creating a planar morphological structural element having a morphology similar to that of a target object to obtain a background image without the target object; obtaining a second intermediate image by a subtraction operation of the first intermediate image and the background image; improving an image contrast of the second intermediate image again to obtain a third intermediate image; and binarizing the third intermediate image by using a local adaptive threshold binarization algorithm and removing a background noise to obtain a final binarized image. The binarization method can improve the uneven brightness of the image under complex illumination, alleviate the artifacts, and strip similar objects from the background with similar gray scales.

5 Claims, 5 Drawing Sheets

(51) Int. Cl.
  *G06T 5/40* (2006.01)
  *G06V 10/28* (2022.01)
  *G06V 10/60* (2022.01)
  *H04N 5/272* (2006.01)

(52) U.S. Cl.
  CPC ............ *G06V 10/60* (2022.01); *H04N 5/272* (2013.01); *G06T 2207/10081* (2013.01)

(58) Field of Classification Search
  USPC ........................................................ 382/251
  See application file for complete search history.

(56) References Cited

U.S. PATENT DOCUMENTS

| | | | |
|---|---|---|---|
| 2016/0188954 A1* | 6/2016 | Ajemba ................... | G06T 7/11 382/128 |
| 2017/0106215 A1* | 4/2017 | Boutry-Duthil ..... | A61N 5/1071 |
| 2019/0365341 A1* | 12/2019 | Chan ..................... | G06T 7/0012 |
| 2020/0273171 A1* | 8/2020 | Drown ..................... | G06T 7/60 |
| 2020/0372635 A1* | 11/2020 | Veidman ................. | G06T 7/194 |
| 2021/0319539 A1* | 10/2021 | Agarwal ............... | G06T 7/0012 |

OTHER PUBLICATIONS

CNIPA, Notification to grant patent right for invention in CN202310274184.X, dated Sep. 7, 2023.

\* cited by examiner

BINARIZATION METHOD FOR CT SECTIONAL IMAGE OF FIBER PACKAGE CONTAINING ARTIFACTS

TECHNICAL FIELD

The disclosure relates to the technical field of digital image processing methods, particularly to a binarization method for computed tomography (CT) sectional image of fiber package containing artifacts.

BACKGROUND

Image binarization technology is a basic technology for digital image processing. The image binarization technology refers to an image processing method that divides an image to obtain an image with black and white colors by threshold segmentation method, which can greatly reduce the amount of data in the image and highlight a target object, and thus can facilitate further processing of the image. At present, the image binarization technology has been widely used in materials engineering, industrial manufacturing, robot vision, military guidance and other fields. However, the result of threshold segmentation largely depends on the choice of threshold, so the key of the image binarization technology lies in the determination of a gray threshold. According to manners of determining the gray threshold, the image binarization technology can be basically divided into two categories. One of the two categories is based on a global threshold, specifically, all pixels of the whole image are binarized with a single threshold, and if a gray value of a current pixel is greater than the single threshold, the gray value of the current pixel is taken as a maximum gray value, otherwise the gray value of the current pixel is taken as a minimum gray value. The single threshold is generally calculated according to a certain rule through a histogram of image gray distribution. Typical binarization methods based on global threshold include a maximum between-class variance method, an iterative method, a maximum entropy segmentation method, and other methods. The binarization method based on global threshold is simple in algorithm and has a fast processing speed, and is suitable for a situation that a target object has strong contrast with a background. However, the binarization method based on global threshold cannot take into account the influence of complex situations such as uneven illumination and special regions, so it is easy to lose information. The other of the two categories is based on local threshold, specifically, for each pixel, according to gray information of all pixels in a neighborhood of the pixel, a gray threshold of the pixel is calculated based on a certain rule. Typical binarization methods based on local threshold include Niblack algorithm, Sauvola algorithm, and Bernsen algorithm. Compared with the binarization method based on global threshold, the binarization method based on local threshold can adapt to more complex situations, such as uneven illumination and obvious shadows. However, the binarization method based on local threshold will cause small pieces of background to be binarized obviously into a foreground, thereby resulting in more noise in a binarization result.

In the process of binarization of a CT sectional image of a fiber package, there are two problems, namely, it is difficult to peel off a target object and a complex background with similar gray scales, and there are strong artifacts caused by a high-density region. However, the existing two categories of binarization methods cannot achieve ideal binarization effect on the CT sectional image of fiber package containing artifacts, which seriously affects the subsequent identification and reconstruction simulation of an optical fiber core. Therefore, it is urgent to propose a binarization processing method that can improve the artifacts and accurately separate the optical fiber core.

SUMMARY

An objective of the disclosure is to provide a binarization method for a CT sectional image of fiber package containing artifacts, which can solve the problems in the related art that a CT sectional image of a fiber package has strong artifacts and a target object is difficult to peel off from a background with the similar gray scale as the target object.

A binarization method for CT sectional image of fiber package containing artifacts is provided, which includes:

step 1, inputting a source image I of a CT sectional image of fiber package containing artifacts, converting the source image I into a hue-saturation-value (HSV) image model, and performing brightness adjustment on the source image I obtained after converting of the HSV image model to thereby obtain a first intermediate image $I_1$;

step 2, creating a planar morphological structural element SE having a morphology similar to that of a target object, and deleting a subject not containing the planar morphological structural element SE in the first intermediate image $I_1$ to thereby obtain a background image $I_b$ without the target object;

step 3, replacing a background of the first intermediate image $I_1$ with a black background by performing a subtraction operation on pixels of the first intermediate image $I_1$ and pixels of the background image $I_b$, to thereby obtain a second intermediate image $I_2$, where the second intermediate image $I_2$ is obtained by a formula 3.1 expressed as follows:

$$I_2 = I_1 - I_b \quad \text{(formula 3.1)};$$

step 4, expanding a gray value change interval of a main region (i.e., target region) of the second intermediate image $I_2$ to improve an image contrast of the second intermediate image $I_2$ and thereby obtain a third intermediate image $I_3$;

step 5, binarizing the third intermediate image $I_3$ by using a local adaptive threshold binarization algorithm, to thereby obtain a binarized image $I_4$; and step 6, removing a background noise of the binarized image $I_4$ to thereby obtain a final binarized image $I_5$.

In an embodiment, the step 1 specifically includes:

step 1.1, defining a brightness value of each pixel of the source image I as V, and $V \in [0, 255]$;

step 1.2, drawing a brightness distribution histogram of the source image I to thereby obtain a range [a, b] of a brightness value $V_{gx}$ of a fiber region of the fiber package, a maximum value M of the brightness value $V_{gx}$, and a range [a', b'] of a brightness value $V_{wy}$ of a region of the fiber region most affected by the artifacts; and step 1.3, performing, based on a composite tangent function and according to a formula 1.1, nonlinear brightness adjustment on each pixel of the source image I obtained after converting of the HSV image model, to thereby obtain the first intermediate image $I_1$:

$$V' = V - A\tan(BV + \varphi) \quad \text{(formula 1.1)},$$

where V' represents a lightness value after nonlinear brightness adjustment, V represents the brightness value before nonlinear brightness adjustment, A represents a range control coefficient, B represents an adjustment coefficient of lightness control range, and φ represents an origin-point control coefficient;
where in the step 1.3,
the composite tangent function is a part of a tangent function in a range of [−3 T/8, 3 T/8], T represents a period of the tangent function;
the range control coefficient A satisfies a formula 1.2:

$$A < \frac{255 - M}{\tan\left(\frac{3T}{8}\right)};\qquad\text{(formula 1.2)}$$

the adjustment coefficient of lightness control range B satisfies a formula 1.3:

$$\frac{3T}{4(2a' - a - b)} < B < \frac{3T}{1020}; \text{ and}\qquad\text{(formula 1.3)}$$

the origin-point control coefficient co satisfies a formula 1.4:

$$\varphi = -B\frac{a+b}{2}.\qquad\text{(formula 1.4)}$$

In an embodiment, the step 2 specifically includes:
step 2.1, creating the planar morphological structural element SE in combination with the morphology of the target object by using a command expressed in an expression 2.1, to make the target object not contain the planar morphological structural element SE:

$$SE=\text{strel}(\text{shape},\text{parameters})\qquad\text{(expression 2.1)},$$

where shape represents a shape of the planar morphological structural element SE, the shape includes one of diamond, disk, line, and octagon, and parameters represent a shape information parameter includes one of a length L, a radius R, and an angle D; and
step 2.2, deleting the subject not containing the planar morphological structural element SE created in the step 2.1 in the first intermediate image $I_1$ by using an image opening operation and based on a command expressed in an expression 2.2, to thereby obtain the background image $I_b$, without the target object:

$$I_b=\text{imopen}(I_1,SE)\qquad\text{(expression 2.2)}$$

In an embodiment, in the step 2, the target object is a section of the optical fiber core, the shape of the planar morphological structural element SE is disk, the shape information parameter is the radius R, and the radius R is greater than a maximum radius of the section of the optical fiber core.

In an embodiment, the step 4 specifically includes:
step 4.1, drawing a gray distribution histogram of the second intermediate image $I_2$ to thereby determine the gray value change interval of the main region (i.e., target region) of the second intermediate image $I_2$ as an interval of [MIN, MAX]; and
step 4.2, normalizing the interval of [MIN, MAX] to obtain an interval [min, max] on an interval of [0, 1], and mapping a gray value between min and max to the interval of [0, 1] by using an imadjust function and based on a command expressed in an expression 4.1, to expand the gray value change interval of the second intermediate image $I_2$ and thereby obtain the third intermediate image $I_3$:

$$I_3=\text{imadjust}(I_2,[\min,\max],[0,1])\qquad\text{(expression 4.1)},$$

where a gray value $T_f$ of each pixel of the third intermediate image $I_3$ obtained by expansion is expressed in a formula 4.2 as follows:

$$T_f = \begin{cases} 255\min & T_2 < \min \\ \frac{1}{\max - \min} \times (T_2 - \min) \times 255 & \min < T_2 < \max \\ 255\max & T_2 > \max \end{cases}\qquad\text{(formula 4.2)}$$

where $T_2$ represents a gray value of each pixel of the second intermediate image $I_2$.

In an embodiment, the step 5 specifically includes:
step 5.1, when different neighborhood radii are selected, calculating a relative difference Δ between a connected domain number $n_r$ and an actual section number N of an optical fiber core in a same region according to a formula 5.1, and adaptively obtaining an optimal neighborhood radius r required by the local adaptive threshold binarization algorithm for achieving an optimal binarization effect:

$$\Delta = \left|\frac{n_r - N}{N}\right|;\qquad\text{(formula 5.1)}$$

step 5.2, calculating a gray mean m(x, y) and a standard variance s(x, y) in a neighborhood of r×r of each pixel of the third intermediate image $I_3$ according to a formula 5.2 and a formula 5.3, respectively:

$$m(x, y) = \frac{1}{r^2}\sum_{i=x-\frac{r}{2}}^{x+\frac{r}{2}}\sum_{j=y-\frac{r}{2}}^{y+\frac{r}{2}} g(i, j);\qquad\text{(formula 5.2)}$$

$$s(x, y) = \sqrt{\frac{1}{r^2}\sum_{i=x-\frac{r}{2}}^{x+\frac{r}{2}}\sum_{j=y-\frac{r}{2}}^{y+r} (g(i, j) - m(x, y))^2};\qquad\text{(formula 5.3)}$$

where g(i, j) represents a gray value of each pixel in the neighborhood of r×r; and
step 5.3, calculating a binarization threshold T(x, y) of each pixel in the neighborhood of r×r according to a formula 5.4, and obtaining a binarized image $I_4$:

$$T(x,y)=m(x,y)+z\cdot s(x,y)\qquad\text{(formula 5.4)},$$

where z represents a denoising coefficient, which is preset by experience.

In an embodiment, in the step 6, the removing a background noise of the binarized image $I_4$ to thereby obtain a final binarized image $I_5$ specifically includes:
performing, based on a command expressed in an expression 6.1, an image opening operation to delete each connected domain with an area less than P pixels from the binary image $I_4$ to thereby obtain the final binarized image $I_5$, where P is less than a minimum pixel value occupied by the optical fiber core after binarizing:

$$I_5 = \text{bwareaopen}(I_4, P). \quad \text{(expression 6.1)}$$

The disclosure has at least the following beneficial effects.

(1) In the disclosure, the binarization method for CT sectional image of fiber package containing artifacts uses the composite tangent function to perform brightness adjustment on the source image obtained after converting of the HSV image model, and brightness adjustment parameters can be directly calculated and adjusted according to a brightness distribution histogram of the source image. This brightness adjustment manner meets the adjustment requirements under complex illumination conditions, is more flexible and accurate, and can effectively improve the uneven brightness of image under complex illumination conditions, thereby greatly reducing the influence of artifacts caused by high-density region on image processing.

(2) In the disclosure, the binarization method for CT sectional image of fiber package containing artifacts combines a morphological method and the local adaptive threshold binarization algorithm, and most of parameters thereof can be directly measured by an image measuring tool, and thus the most of parameters are accurate and the binarization method is convenient, and a error rate is extremely low, so that a large number of similar objects can be efficiently and accurately stripped from a background with similar gray scales as the large number of similar objects.

DETAILED DESCRIPTION OF EMBODIMENTS

The disclosure will be described in detail with reference to the companying drawings and specific embodiments.

Figure 1:
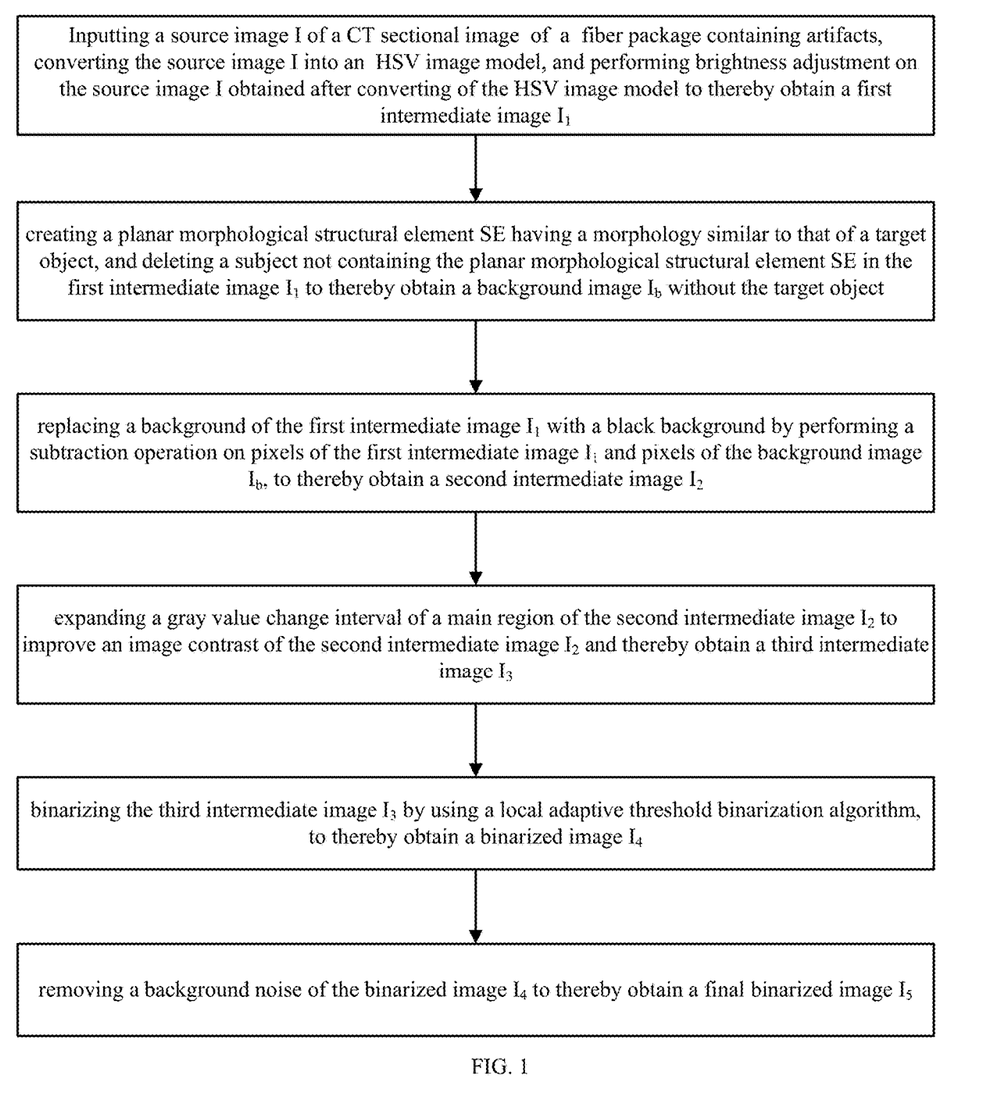
FIG. 1 illustrates a flow chart of a binarization method for CT sectional image of fiber package containing artifacts according to an embodiment of the disclosure.

A flow chart of a binarization method for CT sectional image of fiber package containing artifacts of the disclosure is shown in FIG. 1, and the binarization method includes step 1 to step 6.

In step 1, a source image I of a CT sectional image of fiber package containing artifacts is inputted into a binarization device (includes a processor and a memory) in which a corresponding software is installed, the source image I is converted into a hue-saturation-value (HSV) image model, and brightness adjustment is performed on the source image I obtained after converting of the HSV image model to thereby obtain a first intermediate image $I_1$.

Specifically, the step 1 may include:

step 1.1, defining a brightness value of each pixel of the source image I as V, and $V \in [0, 255]$;

step 1.2, drawing a brightness distribution histogram of the source image I to thereby obtain a range [a, b] of a brightness value $V_{gx}$ of a fiber region of the fiber package, a maximum value M of the brightness value $V_{gx}$, and a range [a', b'] of a brightness value $V_{wy}$ range of a region (such as the region is located near a metal component) of the fiber region most affected by the artifacts; and step 1.3, performing, based on a composite tangent function and according to a formula 1.1, nonlinear brightness adjustment on each pixel of the source image I obtained after converting of the HSV image model, to thereby obtain the first intermediate image $I_1$:

$$V' = V - A\tan(BV + \varphi) \quad \text{(formula 1.1)},$$

where V' represents a lightness value after nonlinear brightness adjustment, V represents the brightness value before nonlinear brightness adjustment, A represents a range control coefficient, B represents an adjustment coefficient of lightness control range, and p represents an origin-point control coefficient;

In order to avoid over-adjustment of brightness, a part of a tangent function in a range of $[-3T/8, 3T/8]$ is taken as the composite tangent function, and T represents a period of the tangent function.

In order to make the lightness value after nonlinear brightness adjustment not exceed 255, the range control coefficient A should satisfy a formula 1.2:

$$A < \frac{255 - M}{\tan\left(\frac{3T}{8}\right)}. \quad \text{(formula 1.2)}$$

In order to ensure that the period of the tangent function is greater than the range of lightness value [0, 255] and it can cover all points and realize the obvious adjustment of the region containing artifacts, the adjustment coefficient of lightness control range B should satisfy a $$\frac{3T}{4(2a' - a - b)} < B < \frac{3T}{1020} \quad \text{(formula 1.3)}$$

In order to make the range [a, b] of the brightness value $V_{gx}$ of a fiber region of the fiber package be in the center of the tangent function, so that the brightness of a fiber region of the fiber package is not adjusted or fine-tuned, the origin-point control coefficient φ should satisfy a formula 1.4:

$$\varphi = -B\frac{a+b}{2}. \qquad \text{(formula 1.4)}$$

In step 2, a planar morphological structural element SE is created, whose morphology is similar to a morphology of a target object, and a subject not containing the planar morphological structural element SE is deleted in the first intermediate image $I_1$ to thereby obtain a background image $I_b$ without the target object.

Specifically, the step 2 may include:

step 2.1, creating the planar morphological structural element SE in combination with the morphology of the target object by using a command expressed in an expression 2.1, to make the target object not contain the planar morphological structural element SE:

$$SE = \text{strel(shape,parameters)} \qquad \text{(expression 2.1)},$$

where shape represents a shape of the planar morphological structural element SE, the shape includes one of diamond, disk, line, and octagon, and parameters represent a shape information parameter including one of a length L, a radius R, and an angle D; and step 2.2, deleting the subject not containing the planar morphological structural element SE created in the step 2.1 in the first intermediate image $I_1$ by using an image opening operation and based on a command expressed in an expression 2.2, to thereby obtain the background image $I_b$ without the target object:

$$I_b = \text{imopen}(I_1, SE) \qquad \text{(expression 2.2)}$$

For the CT sectional image of the fiber package of the disclosure, the target object is a section of the optical fiber core, the shape of the planar morphological structural element SE is preferable disk, the shape information parameter is preferable the radius R, and the radius R is greater than a maximum radius of the section of the optical fiber core.

In step 3, a background of the first intermediate image $I_1$ is replaced with a black background by performing a subtraction operation on pixels of the first intermediate image $I_1$ and pixels of the background image $I_b$, to thereby obtain a second intermediate image $I_2$, where the second intermediate image $I_2$ is obtained by a formula 3.1 expressed as follows:

$$I_2 = I_1 - I_b \qquad \text{(formula 3.1)}.$$

In step 4, a gray value change interval of a main region of the second intermediate image $I_2$ is expanded to improve an image contrast of the second intermediate image $I_2$ and thereby obtain a third intermediate image $I_3$.

Specifically, the step 4 may include:

step 4.1, drawing a gray distribution histogram of the second intermediate image $I_2$ to thereby determine the gray value change interval of the main region (i.e., target region) of the second intermediate image $I_2$ as an interval of [MIN, MAX]; and step 4.2, normalizing the interval of [MIN, MAX] to obtain an interval [min, max] on an interval of [0,1], and mapping a gray value between min and max to the interval of [0,1] by using an imadjust function and based on a command expressed in an expression 4.1, to expand the gray value change interval of the second intermediate image $I_2$ and thereby obtain the third intermediate image $I_3$:

$$I_3 = \text{imadjust}(I_2, [\min,\max], [0,1]) \qquad \text{(expression 4.1)},$$

where a gray value $T_f$ of each pixel of the third intermediate image $I_3$ obtained by expansion is expressed in a formula 4.2 as follows:

$$T_f = \begin{cases} 255\min & T_2 < \min \\ \frac{1}{\max - \min} \times (T_2 - \min) \times 255 & \min < T_2 < \max \\ 255\max & T_2 > \max \end{cases} \qquad \text{(formula 4.2)}$$

where $T_2$ represents a gray value of each pixel of the second intermediate image $I_2$.

In step 5, the third intermediate image $I_3$ is binarized by using a local adaptive threshold binarization algorithm, to thereby obtain a binarized image $I_4$.

Specifically, the step 5 may include:

step 5.1, when different neighborhood radii are selected, calculating a relative difference $\Delta$ between a connected domain number $n_r$ and an actual section number N of an optical fiber core in a same region according to a formula 5.1, and adaptively obtaining an optimal neighborhood radius r required by the local adaptive threshold binarization algorithm for achieving an optimal binarization effect:

$$\Delta = \left| \frac{n_r - N}{N} \right|; \qquad \text{(formula 5.1)}$$

step 5.2, calculating a gray mean m(x, y) and a standard variance s(x, y) in a neighborhood of r×r of each pixel of the third intermediate image $I_3$ according to a formula 5.2 and a formula 5.3, respectively:

$$m(x, y) = \frac{1}{r^2} \sum_{i=x-\frac{r}{2}}^{x+\frac{r}{2}} \sum_{j=y-\frac{r}{2}}^{y+\frac{r}{2}} g(i, j); \qquad \text{(formula 5.2)}$$

$$s(x, y) = \sqrt{\frac{1}{r^2} \sum_{i=x-\frac{r}{2}}^{x+\frac{r}{2}} \sum_{j=y-\frac{r}{2}}^{y+r} (g(i, j) - m(x, y))^2}; \qquad \text{(formula 5.3)}$$

where g(i, j) represents a gray value of each pixel in the neighborhood of r×r; and step 5.3, calculating a binarization threshold T(x, y) of each pixel in the neighborhood of r×r according to a formula 5.4, and obtaining a binarized image $I_4$:

$$T(x,y) = m(x,y) + z \cdot s(x,y) \qquad \text{(formula 5.4)},$$

where z represents a denoising coefficient, which is preset by experience.

In step 6, a background noise of the binarized image $I_4$ is removed to thereby obtain a final binarized image $I_5$.

Specifically, the step 6 may include:

performing, based on a command expressed in an expression 6.1, an image opening operation on the binarized image $I_4$ to delete each connected domain with an area less than P pixels from the binary image $I_4$ to thereby obtain the final binarized image $I_5$, where P is less than a minimum pixel value occupied by the section of the optical fiber core after binarizing:

$$I_5 = \text{bwareaopen}(I_4, P) \qquad \text{(expression 6.1)}.$$

Embodiment 1

Because the data volume of the CT sectional image of the fiber package is too large, and a running time of the software is too long, the disclosure will take a partial image of a fiber package which is most affected by artifacts (i.e, 1/10) as an example for binarization, and other parts of the CT sectional image of the fiber package or other similar sectional images can also be processed by the same method. The processing specifically includes the following steps 1-6.

Figure 2:
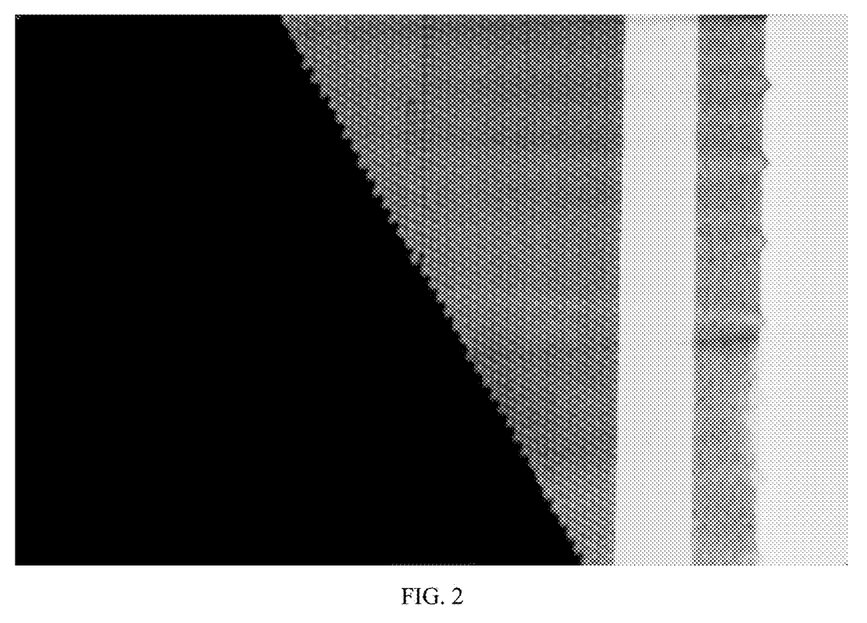
FIG. 2 illustrates a source image I of a local CT sectional image of fiber package containing artifacts according to an embodiment 1 of the disclosure.

In the step 1, a source image I of a CT sectional image of fiber package containing artifacts as shown in FIG. 2 is obtained, and the source image I is inverted from an RGB image model into a HSV image model, i.e., a hexcone model. H represents hue, S presents saturation, and V represents value (also referred to as lightness). According to brightness value distribution of the source image I, a brightness distribution histogram of the source image I is drawn. A range [a, b] of a brightness value $V_{gx}$ of a fiber region of the fiber package, a maximum value M of the brightness value $V_{gx}$ of the fiber region, and a range [a', b'] of a brightness value V range of a region of the fiber region greatly affected by the artifacts Then, based on a composite tangent function and according to a formula 1.1, nonlinear brightness adjustment is performed on each pixel of the source image I obtained after converting of the HSV image model:

$$V' = V - A\tan(BV + \varphi) \quad \text{(formula 1.1)},$$

where V' represents a lightness value after nonlinear brightness adjustment, V represents the brightness value before nonlinear brightness adjustment, A represents a range control coefficient, B represents an adjustment coefficient of lightness control range, and φ represents an origin-point control coefficient. In order to achieve the effects of no adjustment or fine adjustment of the brightness in most of the fiber region of the fiber package, obvious adjustment of the brightness in a region of the fiber region greatly affected by the artifacts and obvious adjustment of a metal reflective region, the following conditions should be satisfied.

In order to make the lightness value after nonlinear brightness adjustment not exceed 255, the range control coefficient A should satisfy a formula 1.2:

$$A < \frac{255 - M}{\tan\left(\frac{3T}{8}\right)}. \quad \text{(formula 1.2)}$$

In order to ensure that the period of the tangent function is greater than the range of lightness value [0, 255] and it can cover all points and realize the obvious adjustment of the region containing artifacts, the adjustment coefficient of lightness control range B should satisfy a $$\frac{3T}{4(2a' - a - b)} < B < \frac{3T}{1020}. \quad \text{(formula 1.3)}$$

In order to make the range [a, b] of the brightness value $V_{gx}$ of a fiber region of the fiber package be in the center of the tangent function, so that the brightness of a fiber region of the fiber package is not adjusted or fine-tuned, the origin-point control coefficient φ should satisfy a formula 1.4:

$$\varphi = -B\frac{a+b}{2}. \quad \text{(formula 1.4)}$$

Figure 3:
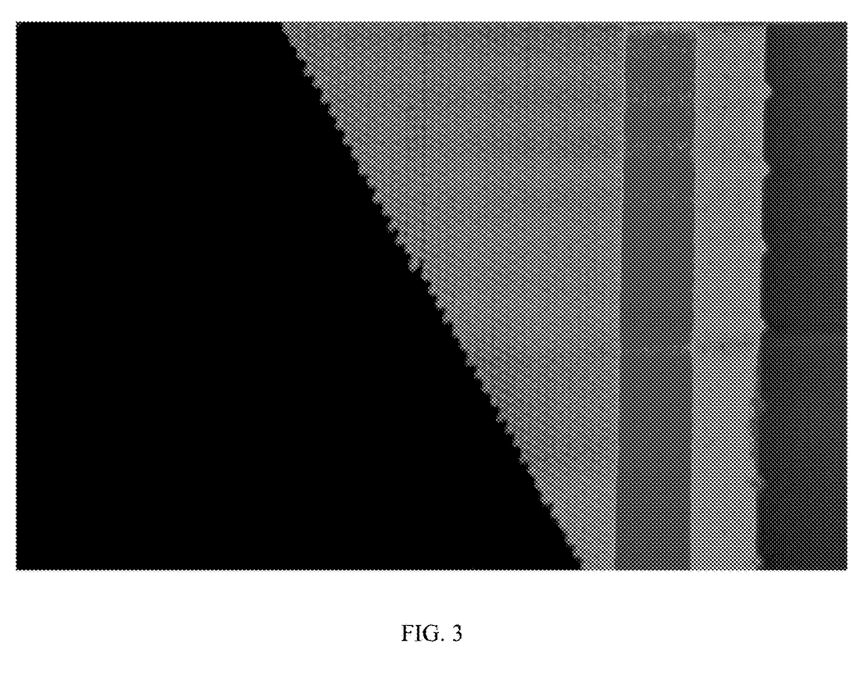
FIG. 3 illustrates is a first intermediate image $I_1$ of the local CT sectional image of fiber package containing artifacts according to the embodiment 1 of the disclosure.

When the above conditions are satisfied, optimal coefficient values A, B, and φ are determined according to the effect of image adjustment, and the optimal coefficient values are substituted into the formula 1.1. Brightness adjustment is performed on the source image I of the CT sectional image of fiber package containing artifacts, to thereby obtain a first intermediate image $I_1$ of the CT sectional image of fiber package containing artifacts, as shown in FIG. 3.

Figure 4:
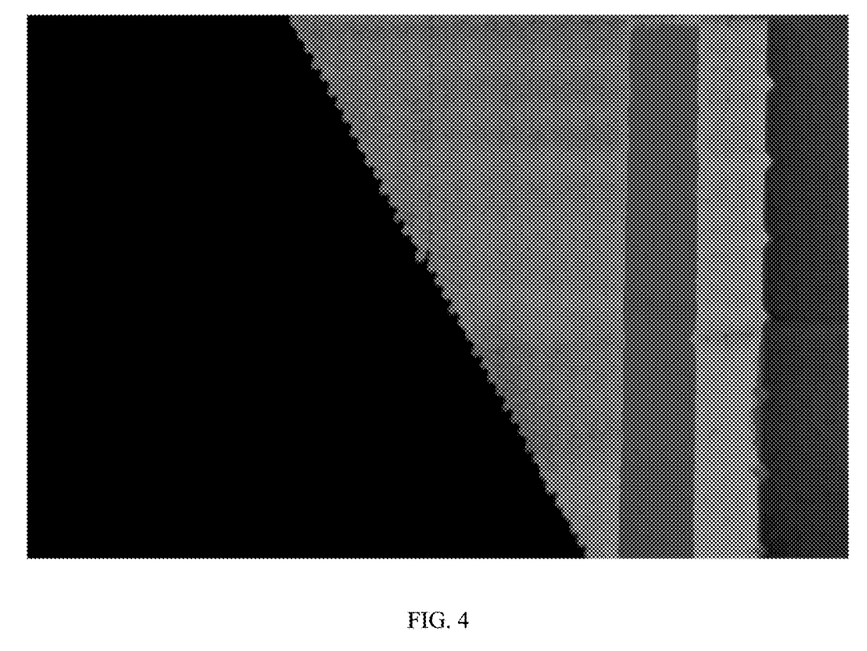
FIG. 4 illustrates is a background image $I_b$ of the local CT sectional image of fiber package containing artifacts according to the embodiment 1 of the disclosure.

In step 2, an image measuring tool imdistline in matlab is used to measure and determine a maximum radius $r_{max}$ of the optical fiber core cross section; and combine with a morphology of a section of the optical fiber core and according to a command expressed in an expression 2.3, a disk-shaped planar shape structural element SE with similar shape as the morphology of a section of the optical fiber core is created, a radius of the disk-shaped planar shape structural element SE is R, and R is slightly larger than the maximum radius $r_{max}$ of the optical fiber core cross section, so as to ensure that all sections of the optical fiber core can be deleted by an image opening operation:

$$SE = \text{strel}(\text{disk}, R) \quad \text{(expression 2.3)},$$

Further, a fine element subject (i.e., the sections of the optical fiber core) not containing the disk-shaped planar morphological structural element SE created in the step 2.1 is deleted from the first intermediate image $I_1$ by using the image opening operation and based on a command expressed in an expression 2.2. In this manner, a composite cladding of the optical fiber is separated from the optical fiber core of the optical fiber, and finally a background image $I_b$ containing only the composite cladding and a background is obtained, as shown in FIG. 4. The expression 2.2 is as follows.

$$I_b = \text{imopen}(I_1, SE) \quad \text{(expression 2.2)}$$

Figure 5:
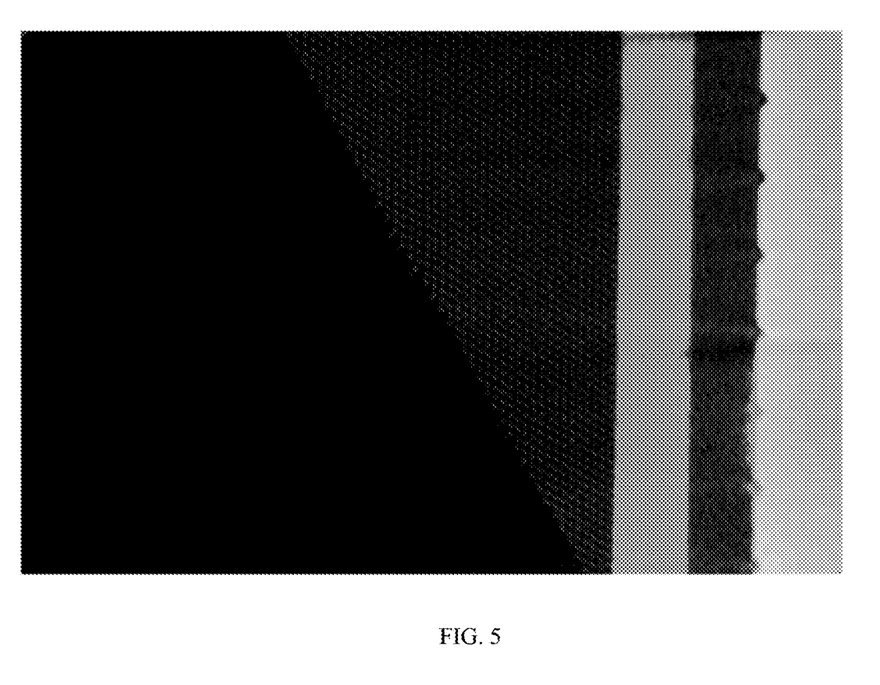
FIG. 5 illustrates is a second intermediate image $I_2$ of the local CT sectional image of fiber package containing artifacts according to the embodiment 1 of the disclosure.

In step 3, a subtraction operation is performed on pixels of the first intermediate image $I_1$ and pixels of the background image $I_b$ obtained in the step 2 according to a formula 3.1, to replace a background and a cladding of the first intermediate image $I_1$ with a black background and thereby obtain a second intermediate image $I_2$ only containing the optical fiber core, as shown in FIG. 5. The formula 3.1 is as follows:

$$I_2 = I_1 - I_b \quad \text{(formula 3.1)}.$$

Since there are still interference elements around the optical fiber core in the second intermediate image $I_2$ obtained after background replacement, it is still necessary to further improve an image contrast of the second intermediate image $I_2$.

Figure 6:
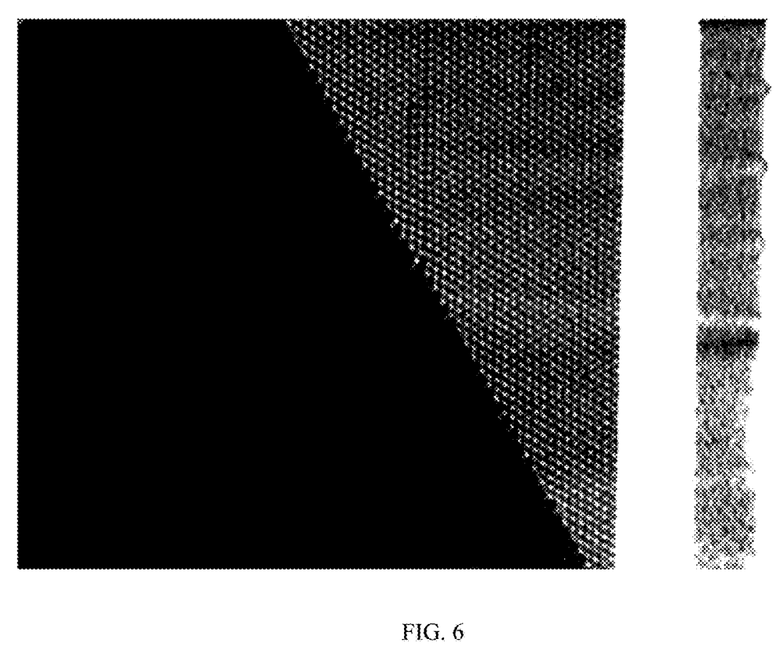
FIG. 6 illustrates is a third intermediate image $I_3$ of the local CT sectional image of fiber package containing artifacts according to the embodiment 1 of the disclosure.

In step 4, a gray distribution histogram of the second intermediate image $I_2$ is drawn, and based on the gray distribution histogram of the second intermediate image $I_2$, it is determined that gray values of a main region containing an optical fiber are concentrated in an interval of [MIN, MAX]; and the interval of [MIN, MAX] is normalized to obtain an interval [min, max] on an interval of [0,1], and a gray value between min and max is mapped to the interval of [0,1] by using an imadjust function and based on a command expressed in an expression 4.1, to expand a gray value change interval (i.e., an interval between adjacent grays) of the second intermediate image $I_2$ to improve contrasts of gray-scale close regions and thereby obtain the third intermediate image $I_3$, as shown in FIG. 6. The expression 4.1 is as follows:

$$I_3 = \text{imadjust}(I_2, [\min, \max], [0, 1]) \quad \text{(expression 4.1)}.$$

In the expression 4.1, min=MIN/255, and max=MAX/255.

In the expression 4.1, a gray value $T_f$ of each pixel of the third intermediate image $I_3$ obtained by expansion is expressed in a formula 4.2 as follows:

$$T_f = \begin{cases} 255 \min & T_2 < \min \\ \frac{1}{\max - \min} \times (T_2 - \min) \times 255 & \min < T_2 < \max \\ 255 \max & T_2 > \max \end{cases} \quad \text{(formula 4.2)}$$

where $T_2$ represents a gray value of each pixel of the second intermediate image $I_2$.

In step 5, a local adaptive threshold binarization algorithm includes two main parameters, namely a neighborhood radius and a denoising coefficient. Firstly, by using the image length measuring tool imdistline, nine pairs of adjacent sections of the optical fiber core are evenly selected from the inside to the outside and from top to bottom in the third intermediate image $I_3$ of the local CT sectional image of the fiber package, and an average distance $D_m$ between the centroids of the adjacent sections of the optical fiber core is measured, then a selection range of the neighborhood radius of the local adaptive binarization algorithm is determined to be in an interval of $[D_m, 2D_m]$.

Secondly, an actual section number N of the optical fiber core contained in the local CT sectional image of the fiber package is counted. Starting from $D_m$, a step size is taken as 1, when different neighborhood radii are selected, a relative difference $\Delta$ between a connected domain number $n_r$ and an actual section number N of an optical fiber core in a same region is calculated according to a formula 5.1, and an optimal neighborhood radius r required by the local adaptive threshold binarization algorithm is adaptively determined, and the optimal neighborhood radius r can minimize the relative difference $\Delta$. The relative difference $\Delta$ is as follows:

$$\Delta = \left| \frac{n_r - N}{N} \right|. \quad \text{(formula 5.1)}$$

After the optimal neighborhood radius r is determined, a gray mean $m(x, y)$ and a standard variance $s(x, y)$ in a neighborhood of r×r of each pixel (x, y) of the third intermediate image $I_3$ according to a formula 5.2 and a formula 5.3, respectively:

$$m(x, y) = \frac{1}{r^2} \sum_{i=x-\frac{r}{2}}^{x+\frac{r}{2}} \sum_{j=y-\frac{r}{2}}^{y+\frac{r}{2}} g(i, j); \quad \text{(formula 5.2)}$$

$$s(x, y) = \sqrt{\frac{1}{r^2} \sum_{i=x-\frac{r}{2}}^{x+\frac{r}{2}} \sum_{j=y-\frac{r}{2}}^{y+r} (g(i, j) - m(x, y))^2}; \quad \text{(formula 5.3)}$$

where $g(i,j)$ represents a gray value of each pixel in the neighborhood of r×r.

Finally, a binarization threshold $T(x, y)$ of each pixel in the neighborhood of r×r is calculated according to a formula 5.4:

$$T(x, y) = m(x, y) + z \cdot s(x, y) \quad \text{(formula 5.4)},$$

where z represents a denoising coefficient, which is preset by experience

Figure 7:
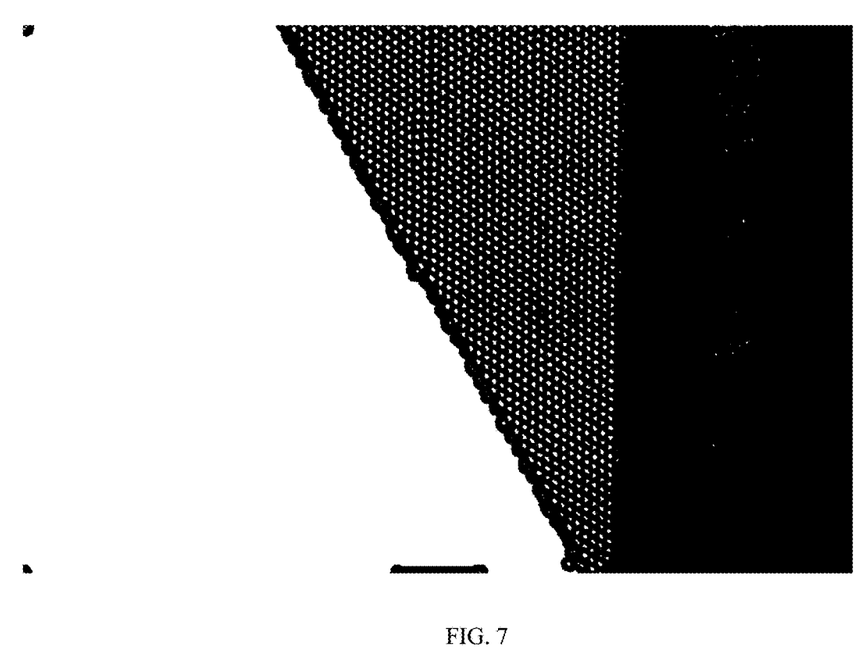
FIG. 7 illustrates is a binarized image $I_4$ of the local CT sectional image of fiber package containing artifacts according to the embodiment 1 of the disclosure.

In the step 5, a binarized image $I_4$ of the local CT sectional image of fiber package containing artifacts is finally obtained, as shown in FIG. 7.

Figure 8:
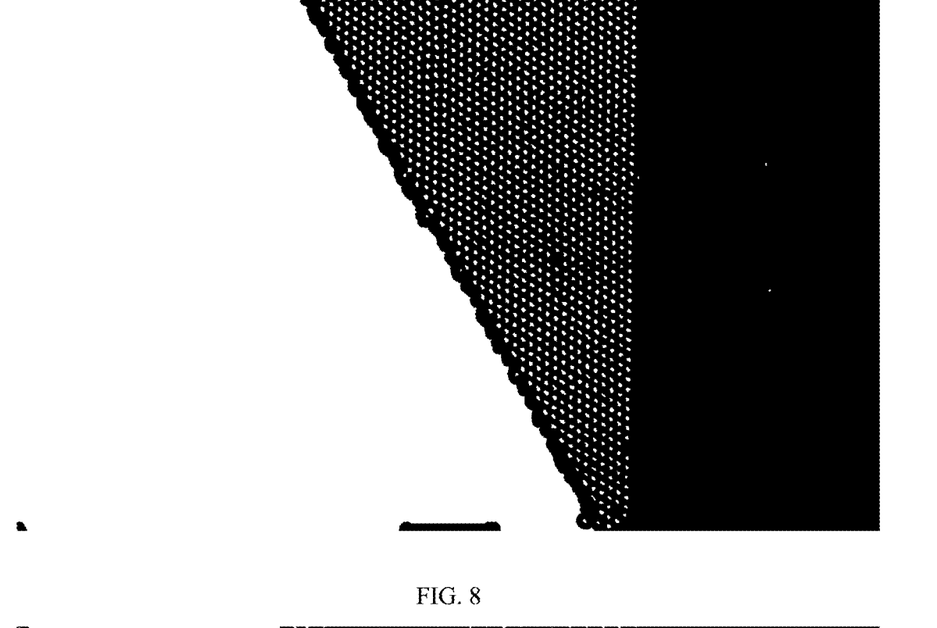
FIG. 8 illustrates is a final binarized image $I_5$ of the local CT sectional image of fiber package containing artifacts according to the embodiment 1 of the disclosure.

Because of the metal reflection, there are still a lot of small noises in the package in the binary image $I_4$, so the image opening operation is used for denoising. In the step 6, based on a command expressed in an expression 6.1, an image opening operation is performed on the binarized image $I_4$ to delete each connected domain with an area less than P pixels from the binary image $I_4$. In order to avoid deleting sectional information of the optical fiber core by mistake, the value of p should be less than a minimum pixel value occupied by the section of the optical fiber core after binarizing. The expression 6.1 is as follow:

$$I_5 = \text{bwareaopen}(I_4, P) \quad \text{(expression 6.1)}.$$

After denoising, a final binarized image $I_5$ of the local CT sectional image of fiber package containing artifacts is obtained, as shown in FIG. 8.

Figure 9:
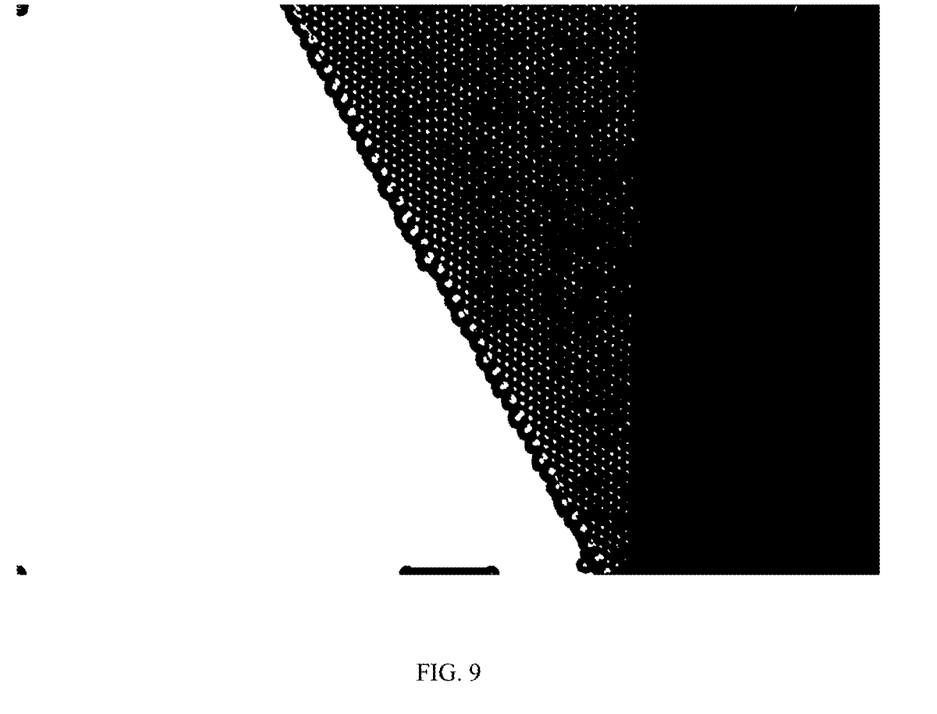
FIG. 9 illustrates is a binarization effect diagram of the local CT sectional image of fiber package containing artifacts obtained by using a local adaptive threshold binarization algorithm.

In addition, in order to further verify the image binarization effect of the binarization method for CT sectional image of fiber package containing artifacts of the disclosure, in the disclosure, the local adaptive threshold binarization algorithm is used to process the source image I of the local CT sectional image of fiber package containing artifacts shown in FIG. 2 under the same conditions, and the corresponding binarization effect diagram is obtained shown in FIG. 9. Combined with FIG. 8 and FIG. 9, it can be seen that compared with the local threshold adaptive binarization algorithm, the binarization method of the disclosure is more accurate in processing the edge of the CT sectional image of the fiber package, the obtained image of the disclosure has much less noise, and the binarization method of the disclosure rarely loses information in the region containing artifacts in the CT sectional image of the fiber package.

What is claimed is:

1. A binarization method for computed tomography (CT) sectional image of fiber package containing artifacts, comprising:
   step 1, inputting a source image I of a CT sectional image of fiber package containing artifacts, converting the source image I into a hue-saturation-value (HSV) image model, and performing brightness adjustment on the source image I obtained after converting of the HSV image model to thereby obtain a first intermediate image $I_1$;
   wherein the step 1 specifically comprises:
      step 1.1, defining a brightness value of each pixel of the source image I as V, and $V \in [0, 255]$;
      step 1.2, drawing a brightness distribution histogram of the source image I to thereby obtain a range [a, b] of a brightness value $V_{gx}$ of a fiber region of the fiber package, a maximum value M of the brightness value $V_{gx}$, and a range [a', b'] of a brightness value V range of a region of the fiber region most affected by the artifacts; and
      step 1.3, performing, based on a composite tangent function and according to a formula 1.1, nonlinear brightness adjustment on each pixel of the source image I obtained after converting of the HSV image model, to thereby obtain the first intermediate image $I_1$:

$$V' = V - A\tan(BV+\varphi) \quad \text{(formula 1.1)},$$

where V' represents a lightness value after nonlinear brightness adjustment, V represents the brightness value before nonlinear brightness adjustment, A represents a range control coefficient, B represents an adjustment coefficient of lightness control range, and φ represents an origin-point control coefficient;

wherein in the step 1.3,
the composite tangent function is a part of a tangent function in a range of [−3 T/8, 3 T/8], T represents a period of the tangent function;
the range control coefficient A satisfies a formula 1.2:

$$A < \frac{255 - M}{\tan\left(\frac{3T}{8}\right)}; \quad \text{(formula 1.2)}$$

the adjustment coefficient of lightness control range B satisfies a formula 1.3:

$$\frac{3T}{4(2a' - a - b)} < B < \frac{3T}{1020}; \text{ and} \quad \text{(formula 1.3)}$$

the origin-point control coefficient co satisfies a formula 1.4:

$$\varphi = -B\frac{a+b}{2}; \quad \text{(formula 1.4)}$$

step 2, creating a planar morphological structural element SE having a morphology similar to that of a target object, and deleting a subject not containing the planar morphological structural element SE in the first intermediate image $I_1$ to thereby obtain a background image $I_b$ without the target object;

step 3, replacing a background of the first intermediate image $I_1$ with a black background by performing a subtraction operation on pixels of the first intermediate image $I_1$ and pixels of the background image $I_b$, to thereby obtain a second intermediate image $I_2$, wherein the second intermediate image $I_2$ is obtained by a formula 3.1 expressed as follows:

$$I_2 = I_1 - I_b \quad \text{(formula 3.1)};$$

step 4, expanding a gray value change interval of a main region of the second intermediate image $I_2$ to improve an image contrast of the second intermediate image $I_2$ and thereby obtain a third intermediate image $I_3$;

step 5, binarizing the third intermediate image $I_3$ by using a local adaptive threshold binarization algorithm, to thereby obtain a binarized image $I_4$;

wherein the step 5 specifically comprises:
step 5.1, when different neighborhood radii are selected, calculating a relative difference Δ between a connected domain number $n_r$ and an actual section number N of an optical fiber core in a same region according to a formula 5.1, and adaptively obtaining an optimal neighborhood radius r required by the local adaptive threshold binarization algorithm for achieving an optimal binarization effect:

$$\Delta = \left|\frac{n_r - N}{N}\right|; \quad \text{(formula 5.1)}$$

step 5.2, calculating a gray mean m(x, y) and a standard variance s(x, y) in a neighborhood of r×r of each pixel of the third intermediate image $I_3$ according to a formula 5.2 and a formula 5.3, respectively:

$$m(x, y) = \frac{1}{r^2} \sum_{i=x-\frac{r}{2}}^{x+\frac{r}{2}} \sum_{j=y-\frac{r}{2}}^{y+\frac{r}{2}} g(i, j); \quad \text{(formula 5.2)}$$

$$s(x, y) = \sqrt{\frac{1}{r^2} \sum_{i=x-\frac{r}{2}}^{x+\frac{r}{2}} \sum_{j=y-\frac{r}{2}}^{y+r} (g(i, j) - m(x, y))^2}; \quad \text{(formula 5.3)}$$

where g(i, j) represents a gray value of each pixel in the neighborhood of r×r; and step 5.3, calculating a binarization threshold T(x, y) of each pixel in the neighborhood of r×r according to a formula 5.4, and obtaining a binarized image $I_4$:

$$T(x,y) = m(x,y) + z \cdot s(x,y) \quad \text{(formula 5.4)},$$

where z represents a denoising coefficient, which is preset by experience; and step 6, removing a background noise of the binarized image $I_4$ to thereby obtain a final binarized image $I_5$.

2. The binarization method for CT sectional image of fiber package containing artifacts as claimed in claim 1, wherein the step 2 specifically comprises:

step 2.1, creating the planar morphological structural element SE in combination with the morphology of the target object by using a command expressed in an expression 2.1, to make the target object not contain the planar morphological structural element SE:

$$SE = \text{strel(shape,parameters)} \quad \text{(expression 2.1)},$$

where shape represents a shape of the planar morphological structural element SE, the shape comprises one of diamond, disk, line, and octagon, and parameters represent a shape information parameter comprising one of a length L, a radius R, and an angle D; and step 2.2, deleting the subject not containing the planar morphological structural element SE created in the step 2.1 in the first intermediate image $I_1$ by using an image opening operation and based on a command expressed in an expression 2.2, to thereby obtain the background image $I_b$ without the target object:

$$I_b = \text{imopen}(I_1, SE) \quad \text{(expression 2.2)}$$

3. The binarization method for CT sectional image of fiber package containing artifacts as claimed in claim 2, wherein in the step 2, the target object is a section of the optical fiber core, the shape of the planar morphological structural element SE is disk, the shape information parameter is the radius R, and the radius R is greater than a maximum radius of the section of the optical fiber core.

4. The binarization method for CT sectional image of fiber package containing artifacts as claimed in claim 2, wherein the step 4 specifically comprises:

step 4.1, drawing a gray distribution histogram of the second intermediate image $I_2$ to thereby determine the gray value change interval of the main region of the second intermediate image $I_2$ as an interval of [MIN, MAX]; and step 4.2, normalizing the interval of [MIN, MAX] to obtain an interval [min, max] on an interval of [0,1], and mapping a gray value between min and max to the interval of [0,1] by using an imadjust function and based on a command expressed in an expression 4.1, to expand the gray value change interval of the second intermediate image $I_2$ and thereby obtain the third intermediate image $I_3$:

$$I_3 = \text{imadjust}(I_2, [\min,\max], [0,1]) \quad \text{(expression 4.1)},$$

wherein a gray value $T_f$ of each pixel of the third intermediate image $I_3$ obtained by expansion is expressed in a formula 4.2 as follows:

$$T_f = \begin{cases} 255 \min & T_2 < \min \\ \dfrac{1}{\max - \min} \times (T_2 - \min) \times 255 & \min < T_2 < \max \\ 255 \max & T_2 > \max \end{cases} \quad \text{(formula 4.2)}$$

where $T_2$ represents a gray value of each pixel of the second intermediate image $I_2$.

5. The binarization method for CT sectional image of fiber package containing artifacts as claimed in claim 1, wherein in the step 6, the removing a background noise of the binarized image $I_4$ to thereby obtain a final binarized image $I_5$ specifically comprises:

performing, based on a command expressed in an expression 6.1, an image opening operation to delete each connected domain with an area less than P pixels from the binary image $I_4$ to thereby obtain the final binarized image $I_5$, where P is less than a minimum pixel value occupied by the optical fiber core after binarizing:

$$I_5 = \text{bwareaopen}(I_4, P) \quad \text{(expression 6.1)}.$$

* * * * *